United States Patent [19]
Masson

[11] Patent Number: 5,447,667
[45] Date of Patent: Sep. 5, 1995

[54] METHOD AND DEVICE FOR THE BLOW MOULDING OF HOLLOW BODIES FROM THERMOPLASTIC MATERIAL

[75] Inventor: Didier Masson, Brussels, Belgium

[73] Assignee: Solvay (Société Anonyme), Brussels, Belgium

[21] Appl. No.: 156,840

[22] Filed: Nov. 24, 1993

[30] Foreign Application Priority Data

Dec. 7, 1992 [BE] Belgium .................. 09201072

[51] Int. Cl.⁶ ............................ B29C 49/58
[52] U.S. Cl. .................. 264/083; 264/528; 264/540; 425/72.1; 425/326.1; 425/532; 425/535
[58] Field of Search .......... 264/83, 528, 540; 425/72.1, 326.1, 535, 536, 532

[56] References Cited

U.S. PATENT DOCUMENTS

| | | | |
|---|---|---|---|
| 2,966,700 | 1/1961 | Dyer et al. | 425/326.1 |
| 3,382,532 | 5/1968 | Schweiger | 425/532 |
| 3,445,891 | 5/1969 | Thordarson | 425/72.1 |
| 3,455,540 | 7/1969 | Maremann . | |
| 3,505,442 | 4/1970 | Culpepper | 264/528 |
| 3,771,931 | 11/1973 | Fischer et al. | 425/532 |
| 3,810,725 | 5/1974 | Trub et al. | 425/72.1 |
| 3,819,317 | 6/1974 | Higginbotham | 425/806 |
| 4,083,653 | 4/1979 | Stiffler . | |
| 4,617,077 | 10/1986 | Giese et al. | 264/516 |
| 5,102,320 | 4/1992 | Rom | 425/72.1 |
| 5,292,466 | 3/1994 | van Bonn et al. | 264/83 |
| 5,326,514 | 7/1994 | Linden et al. | 264/83 |

FOREIGN PATENT DOCUMENTS

| | | | |
|---|---|---|---|
| 0568135 | 11/1993 | European Pat. Off. | 264/83 |
| 3903174 | 8/1990 | Germany | 425/72.1 |
| 61-114835 | 6/1986 | Japan | 425/535 |
| 1104079 | 2/1968 | United Kingdom | 425/326.1 |

*Primary Examiner*—Jeffery R. Thurlow
*Attorney, Agent, or Firm*—Spencer, Frank & Schneider

[57] ABSTRACT

A method for blow molding a hollow body from thermoplastic material, including the steps of providing a blowing nozzle with a mechanical device for stirring. A thermoplastic parison is located within a mold. At least one pressurized gas is injected through the blowing nozzle and into a portion of the thermoplastic parison. A hollow body is formed. The hollow body contains the at least one pressurized gas. The mechanical device continuously stirs to forcible agitate the at least one pressurized gas contained within the hollow body.

8 Claims, 1 Drawing Sheet

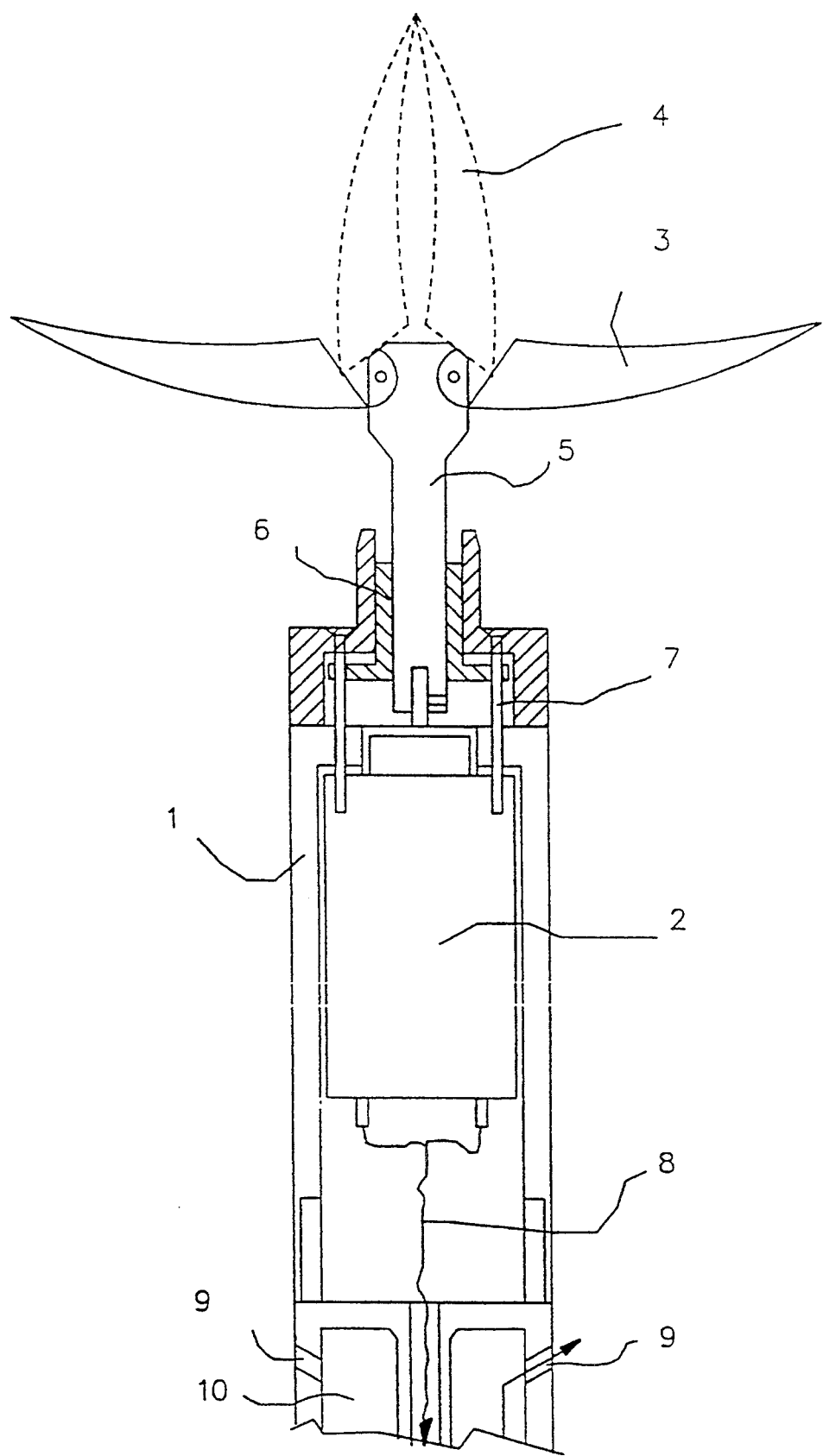

METHOD AND DEVICE FOR THE BLOW MOULDING OF HOLLOW BODIES FROM THERMOPLASTIC MATERIAL

BACKGROUND OF THE INVENTION

The present invention relates to a method and device for the blow moulding of hollow bodies from thermoplastic material.

For the mass production of hollow bodies such as bottles, containers, tanks, etc. from thermoplastic material, the technique of blow moulding is almost universally used, this technique involving trapping a tubular portion of molten thermoplastic material in a suitable blow mould, shaping this parison in the mould using a blowing nozzle which is inserted into the parison and injects therein a pressurized gas, cooling the hollow body thus moulded in the mould and extracting it from the mould.

In order to obtain high productivity during such manufacturing, it is advantageous to accelerate each production step, and in particular the cooling step, which may prove time consuming in particular during the production of hollow bodies with a high wall thickness.

For this purpose, it has in particular been proposed, during the blowing or thereafter, to inject a gas held at a very low temperature (air, cryogenic nitrogen, carbon dioxide, etc.) into the hollow body produced, this cooling of the inner wall being combined with the cooling of the outer wall caused by the mould.

Moreover, for certain applications, it is advantageous to produce hollow bodies from thermoplastic material which exhibit improved impermeability to gases and to liquids.

Thus, for example, it is known that hollow bodies such as fuel tanks made from polyolefins and in particular from high-density polyethylenes, allow a small quantity of the hydrocarbon stored to diffuse through their wall, and consequently, in view of the ecological standards for controlling pollution and respecting the environment, and the conditions imposed by users, it is of paramount importance to carry out a highly efficient treatment for rendering such hollow bodies impermeable, in order to greatly reduce subsequent release of hydrocarbons.

One treatment which proves highly effective for this purpose consists in the surface treatment of the inner wall of these hollow bodies by a reactive gas (fluorine, sulphur trioxide, etc.), it being advantageous for this treatment to be carried out on line during their moulding either by using a reactive gas as the blowing gas or by injecting a reactive gas into the hollow bodies after they have been moulded using a conventional gas (air, nitrogen).

However, when cooling or surface treatment techniques are employed, the cooling or treatment gas is introduced into the moulded hollow bodies and held under pressure throughout the treatment. Consequently, when the turbulence caused by injecting the cooling or treatment gas is dissipated, that is to say, in fact, when the final pressure is reached, the heat exchanges or the treatment reaction are restricted to between the inner wall of the hollow body and the portion of the gas which is situated in direct contact therewith. The result of this is therefore that only a small proportion of the entire quantity of gas injected into the hollow body is found to be actually effective for the desired purpose.

Consequently, for example, during surface treatment of the inner wall of a hollow body such as a tank made from polyolefin intended to contain a mixed fuel containing a compound comprising oxygen, such as methanol, it is necessary to greatly extend the length of treatment with a view to obtaining finally an acceptable impermeability.

SUMMARY OF THE INVENTION

The principal object of the present invention is consequently to provide a very simple method which makes it possible to eliminate all the drawbacks mentioned above.

The present invention consequently relates to a method for the blow moulding of hollow bodies from thermoplastic material, involving injection, through a blowing nozzle, of at least one pressurized gas into a portion of thermoplastic parison contained in a mould, which is characterized in that the gas is subjected to forced agitation during the moulding.

According to an embodiment which is preferred by the Applicant Company, the forced agitation of the gas is obtained with mechanical means provided at the blowing nozzle, which continuously stirs this gas in the moulded hollow body.

A particularly practical means for this purpose consists in providing a mechanical agitation means such as a fan or a turbine at the blowing nozzle.

By virtue of the method according to the invention, the inner wall of the hollow body is kept continually in contact during its production with fresh gas which constitutes the blowing gas, a cooling gas or a surface treatment gas. This results in the action of these gases being made much more efficient and homogeneous which allows, on the one hand, the production times to be reduced and, on the other hand, the consumption of blowing gas, cooling gas and/or reactive gas to be reduced.

The method according to the invention may usefully be employed during the blow moulding of hollow bodies made from any thermoplastic material, and on any conventional extrusion-blow moulding or injection-blow moulding installation.

It should also be noted that the method according to the invention also proves to be of interest during secondary treatment of the inner or outer wall of hollow bodies using a reactive gas, carried out, in a suitable enclosure, after mould release of these hollow bodies. In this case, the forced agitation of the reactive gas, in the treatment enclosure, also makes it possible to make substantial savings of time and reactive gas consumption and, consequently, this variant embodiment should be considered to form an integral part of the scope of the present invention.

The present invention also relates to a device suited for implementing the method which has just been described.

The device according to the invention includes at least one blow mould which can interact with at least one blowing nozzle for producing hollow bodies by blow moulding, which is characterized in that the blowing nozzle is equipped with at least one mechanical means allowing forced agitation of the gases injected into the mould.

According to an embodiment which is preferred by the Applicant Company, this mechanical means advantageously consists of a fan provided in the end of the blowing nozzle and which is therefore introduced into and set in use in the hollow body during its moulding. In view of the fact that this fan is required to be introduced into the blow mould through the blowing orifice of this mould, it is clearly suitable for the fan to be dimensioned accordingly. For this purpose, the Applicant Company prefers the use of a fan equipped with retractable vanes which are folded during its introduction or its withdrawal from the mould and which are unfolded, for example under the action of centrifugal forces, when it is set in use. Other means are however usable and, by way of non-exhaustive example, mention may in particular be made of resorting to a compact compressed-air turbine arranged in the blowing nozzle.

BRIEF DESCRIPTION OF THE DRAWINGS

The device preferred by the Applicant Company is, furthermore, explained in more detail in the following description, in which reference will be made to FIG. 1 of the attached drawing which shows in section a blowing nozzle equipped with a fan.

DETAILED DESCRIPTION OF THE INVENTION

As is shown in the FIGURE, the blowing nozzle 1 is extended by a fan 5 which may be rotated by a motor 2 which can be powered by an external electrical supply via the connections 8 and attached to the nozzle using fastening screws 7.

The fan 5 is equipped with hinged vanes 3, 4 which can be unfolded by centrifugal action when the fan is set in use and be refolded axially into the resting position.

By virtue of this arrangement, the fan 5 can easily be introduced into the tubular parison to be moulded (not shown) when the nozzle is inserted into the blow mould (also not shown) with a view to starting a moulding cycle, or withdrawn from the moulded hollow body when the nozzle is withdrawn from the blow mould at the end of a moulding cycle.

The blowing nozzle 1 also includes, in a conventional manner, a circuit 10 and orifices 9 which allow injection and removal of the blowing, cooling and/or treatment gases into and from the preform or the hollow body already moulded.

When the blowing nozzle 1 is in particular used for injecting a treatment gas, it is clearly suitable for the elements required to be placed in contact with this gas to be made from materials which withstand the action of this gas. It is also suitable in this case to protect the drive motor 2 against attack by this gas, for example by arranging a sealing ring 6 around the shaft of the fan 5.

In one variant embodiment which is not represented, assembly can be carried out such that the motor 2 can be mounted outside the nozzle and, in this case, have larger volume and greater power.

The method and the device according to the invention and the advantages which they provide are, furthermore, illustrated by the embodiments which follow.

EXAMPLE 1

By using the blowing nozzle described hereinabove, equipped with a fan with a power of 10 W, two batches of high-density polyethylene tanks were produced by blow moulding, these tanks having a capacity of 83 litres and a mean wall thickness equal to 5 mm.

For each batch, blowing was carried out for 40 s using nitrogen at room temperature and was followed on line by a fluorination treatment at room temperature consuming 17 g of fluorine (diluted to 2% in nitrogen).

The first batch of tanks was produced without setting the fan in use, whereas the second batch was produced by setting this fan in use.

Tanks sampled from these two batches were then filled with fuel (standardized petrol CEC-RF-08-A-85) to 50% of their useful capacity and stored at 40° C. in accordance with European Directire ECE 34 annex 5, and the losses by weight from these tanks were measured every week for 6 months.

By using this procedure, it was observed that the batch of tanks produced without setting the fan in use sustained a loss of 25 g, whereas this loss was reduced to 16 g for the batch of tanks produced by using the fanning technique.

EXAMPLE 2

By using the blowing nozzle described hereinabove, equipped with a fan with a power of 15 W, two batches of high-density polyethylene tanks were produced by blow moulding, these tanks having a capacity of 60 litres and a mean wall thickness equal to 5.5 mm.

For each batch, the blowing was carried out for 60 s using nitrogen and followed on line by an energetic fluorination treatment consuming 60 g of fluorine.

The first batch of tanks was produced without setting the fan in use, whereas the second batch was produced by setting this fan in use.

Tanks sampled from these two batches were then filled with fuel (standardized petrol CEC-RF-08-A-85 mixed with methanol in the ratio of 85% petrol - 15% methanol by volume) to 50% of their useful capacity. The losses by weight from these tanks were measured every week for 91 days.

By using this procedure, it was observed that the batch of tanks produced without setting the fan in use sustained a daily loss of hydrocarbons as high as 1.3 g/24 h, whereas this loss was reduced to 0.9 g/24 h for the batch of tanks produced by employing the fanning technique.

I claim:

1. A method for blow molding a hollow body from thermoplastic material, comprising the steps of:
   providing a blowing nozzle with mechanical means for stirring;
   locating a thermoplastic parison within a mold;
   injecting at least one pressurized gas through the blowing nozzle and into a portion of the thermoplastic parison;
   forming the hollow body, said hollow body containing the at least one pressurized gas; and
   continuously stirring with the mechanical means to forcible agitate the at least one pressurized gas contained within the hollow body.

2. The method as defined in claim 1, wherein the mechanical means comprises a fan located at an end of the blowing nozzle.

3. The method as defined in claim 1, wherein said at least one pressurized gas contained within the hollow body is a gas used for said forming step.

4. The method as defined in claim 1, further comprising the step of cooling the hollow body using the at least one pressurized gas.

5. The method as defined in claim 1, further comprising the step of surface treating an inner wall of the hollow body using the at least one pressurized gas, the pressurized gas comprising a reactive gas.

6. The method as defined in claim 1, wherein the thermoplastic material comprises a polyolefin.

7. A blow molding device for blow molding a hollow body from thermoplastic material, comprising:

at least one blow mold;

at least one blowing nozzle interacting with said at least one blow mold for injecting gasses therein; and mechanical means operatively connected to said at least one blowing nozzle for forcibly agitating the gasses injected into said blow mold.

8. The blow mold defined in claim 7, wherein said mechanical means comprises a fan located in an end of said at least one blowing nozzle.

* * * * *